(12) United States Patent
Yoshida et al.

(10) Patent No.: US 7,510,800 B2
(45) Date of Patent: Mar. 31, 2009

(54) ALL-SOLID-STATE BATTERY

(75) Inventors: Toshihiro Yoshida, Nagoya (JP);
Hiroyuki Katsukawa, Niwa-Gun (JP);
Kazuhiro Yamamoto, Nagoya (JP);
Shigeto Okada, Fukuoka (JP)

(73) Assignees: NGK Insulators, Ltd., Nagoya (JP);
Kyushu University, Fukuoka (JP)

( * ) Notice: Subject to any disclaimer, the term of this patent is extended or adjusted under 35 U.S.C. 154(b) by 53 days.

(21) Appl. No.: 11/678,149

(22) Filed: Feb. 23, 2007

(65) Prior Publication Data
US 2007/0202400 A1   Aug. 30, 2007

(30) Foreign Application Priority Data
Feb. 24, 2006 (JP) .............................. 2006-048940
Nov. 17, 2006 (JP) .............................. 2006-312177

(51) Int. Cl.
*H01M 10/40*   (2006.01)

(52) U.S. Cl. .................. 429/203; 429/231.95; 429/304; 429/322

(58) Field of Classification Search ........................ None
See application file for complete search history.

(56) References Cited

U.S. PATENT DOCUMENTS

2003/0175585 A1   9/2003   Ugaji et al.

2007/0042265 A1*  2/2007   Tamai et al. ................. 429/162

FOREIGN PATENT DOCUMENTS

| JP | 05-205741 | 8/1993 |
| JP | 2000-311710 | 11/2000 |

OTHER PUBLICATIONS

Chi-Lin Li et al., "*Physical and Electrochemical Characterization of Thin Films of Iron Phosphate and Nitrided Iron Phosphate for All-Solid-State Batteries*," Database Inspection [Online], XP002437512, The Institution of Electrical Engineers, Stevenage, GB, Journal of the Electrochemical Society Electrochem. Soc. USA, vol. 153, No. 9, Sep. 2006, pp. E160-E165.

* cited by examiner

*Primary Examiner*—John S Maples
(74) *Attorney, Agent, or Firm*—Burr & Brown

(57) ABSTRACT

An all-solid battery having a high output power is provided which exhibits high safety and is capable of being produced at a low cost is provided. The all-solid battery includes an internal electrode body having a cathode comprising a cathode material, an anode comprising an anode material, and a solid electrolyte layer comprising a solid electrolyte. The cathode material, the anode material, and the solid electrolyte are phosphoric acid compounds. The internal electrode body is integrated by firing the cathode, the anode, and the solid electrolyte layer, and the internal electrode body contains water.

7 Claims, 4 Drawing Sheets

ALL-SOLID-STATE BATTERY

BACKGROUND OF THE INVENTION

1. Field of the Invention

The present invention relates to an all-solid-state battery having a high output power, exhibiting high safety, and capable of being produced at a low cost.

2. Description of Related Art

In recent years, demand for batteries as a power source has significantly expanded along with development of portable equipment such as a personal computer and a cellular phone. As the medium used to move ions in the batteries in these applications, liquid electrolytes (electrolytic solutions) such as an organic solvent have conventionally been used. Batteries in which such an electrolytic solution is used may have a risk of leakage of electrolytic solution which may induce firing and the like.

In order to solve such a problem, development of an all-solid-state battery in which a solid electrolyte is used instead of a liquid electrolyte and all other components are formed from solid materials has been undertaken. Such an all-solid-state battery not only has no risk of liquid leakage due to the use of a solid electrolyte, but also is free of problems such as deterioration of battery performance caused by corrosion and the like. In particular, an all-solid lithium secondary battery is a popular target of development among researches in various fields as a secondary battery of which the energy density can be easily increased.

As a related art, a lithium secondary battery in which a conductive lithium ion electrolyte such as $Li_2S$—$SiS_2$—$Li_3PO_4$ is used as a solid electrolyte has been disclosed (e.g. JP-A-5-205741).

However, the all-solid-state battery using a solid electrolyte as the electrolyte can output less energy than batteries using a liquid electrolyte. It has been difficult to draw a large current from the all-solid-state battery. Other problems with the all-solid-state battery are poor rate characteristics and cycle characteristics during charging and discharging and a short battery life as compared with batteries using a liquid electrolyte.

In order to solve these problems, a solid electrolyte battery in which the same inorganic oxide material as the solid electrolyte is interposed between electrode active material particles to increase the electric current that can be drawn and to improve charge-and-discharge cycle characteristics has been disclosed (e.g. JP-A-2000-311710).

However, the output characteristics and the like of the solid electrolyte battery disclosed in JP-A-2000-311710 still need to be improved. Therefore, development of an all-solid-state battery exhibiting a higher output is demanded from the industrial world.

The present invention has been achieved in view of these problems in the prior art and has an object of providing an all-solid-state battery having a high output power, exhibiting high safety, and capable of being produced at a low cost.

SUMMARY OF THE INVENTION

As a result of extensive studies to attain the above object, the inventors of the present invention have discovered that a high-output battery with remarkably improved charge-and-discharge characteristics can be obtained by assembling the battery in an aqueous atmosphere.

Specifically, the present invention provides the following all-solid-state battery.

According to a first aspect of the present invention, an all-solid-state battery is provided, comprising an internal electrode body having a cathode comprising a cathode material, an anode comprising an anode material, and a solid electrolyte layer containing a solid electrolyte. The cathode material, the anode material, and the solid electrolyte are phosphoric acid compounds, and the internal electrode body is integrated by firing the cathode, the anode, and the solid electrolyte layer, and the internal electrode body contains water.

According to a second aspect of the present invention, the all-solid-state battery according to the first aspect is provided, wherein the water content of the internal electrode body is 0.3 to 10 mass %.

According to a third aspect of the present invention, the all-solid-state battery according to the first or second aspects is provided, further comprising a battery case, in which the internal electrode body is housed after being allowed to stand in a wet atmosphere and/or in which the internal electrode body is housed in a wet atmosphere.

According to a fourth aspect of the present invention, the all-solid-state battery according to any one of the first through third aspect is provided, wherein the internal electrode body is housed in the battery case after water is added to the internal electrode body and/or the battery case.

According to a fifth aspect of the present invention, the all-solid-state battery according to the fourth aspect is provided, wherein the amount of water added to the internal electrode body and/or the battery case is 0.3 to 5 mass % for 100 mass % of the internal electrode body.

According to a sixth aspect of the present invention, the all-solid-state battery according to any one of the first through fifth aspects is provided, wherein the cathode material, anode material, and solid electrolyte are cationic conductors having a NASICON (Na Super Ionic Conductor) structure.

According to a seventh aspect of the present invention, the all-solid-state battery according to any one of the first through sixth aspect is provided, wherein the cations of the cathode material, anode material, and solid electrolyte are lithium cations.

According to an eighth aspect of the present invention, the all-solid-state battery according to any one of the first through seventh aspects is provided, wherein the solid electrolyte is included in the cathode and/or the anode.

The all-solid-state battery of the present invention has a high output power, is highly safe, and can be produced at a low cost.

DETAILED DESCRIPTION OF THE INVENTION AND PREFERRED EMBODIMENTS

Preferred embodiments of the invention are described below. Note that the invention is not limited to the following embodiments. Various modifications and improvements may be made in the embodiments within the scope of the invention based on the knowledge of a person skilled in the art.

Figure 1:
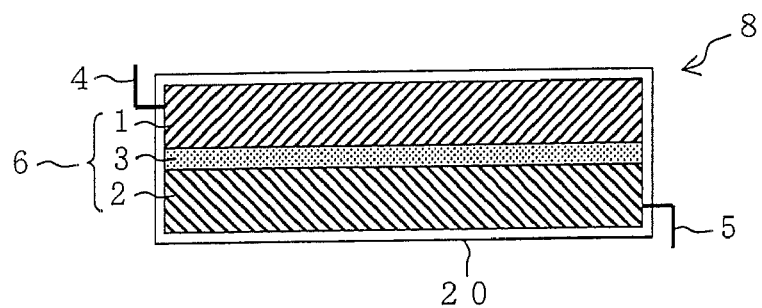
FIG. 1 is a partial schematic diagram showing one embodiment of an all-solid-state battery according to the present invention.

FIG. 1 is a partial schematic diagram showing one embodiment of an all-solid-state battery according to the present invention. As shown in FIG. 1, an all-solid-state battery 8 of this embodiment is provided with an internal electrode body 6 comprising a cathode 1, an anode 2, and a solid electrolyte layer 3 disposed between the cathode 1 and anode 2. A cathode collector 4 is electrically connected to the cathode 1. An anode collector 5 is electrically connected to the anode 2.

The cathode 1 is an area containing a cathode material and has the form of a thin film with a thickness preferably of 5 to 500 micrometers, and still more preferably 20 to 200 micrometers. The cathode material contained in the cathode 1 is a phosphoric acid compound. Specifically, the cathode material used for the all-solid-state battery of the present invention may be a phosphoric acid compound which contains $PO_4$ as a polyanion. As specific examples of the cathode material, phosphoric acid compounds shown by the following formula (1) can be given.

(1)

In the formula (1), M represents H, Li, Na, Mg, Al, K, or Ca, with Li, Na, or Mg being particularly preferable. In the above formula (1), a=0 to 5, b=1 to 2, and c=1 to 3.

In the above formula (1), $N^1$ is at least one metal selected from the group consisting of transition metals, Al, and Cu, with Fe, Co, V, or Cu being particularly preferable. As more specific examples of a preferable cathode material, $LiFePO_4$, $LiCoPO_4$, $Li_3V_2(PO_4)_3$, $LiCuPO_4$, and the like can be mentioned.

The anode 2 is an area containing an anode material and has the form of a thin film with a thickness preferably of 5 to 500 micrometers, and still more preferably 20 to 200 micrometers. The anode material contained in the anode 2 is also a phosphoric acid compound. Specifically, the anode material used for the all-solid-state battery of the present invention may be a phosphoric acid compound which contains $PO_4$ as a polyanion. As specific examples of the anode material, phosphoric acid compounds shown by the following formula (2) can be given.

(2)

In the formula (2), M represents H, Li, Na, Mg, Al, K, or Ca, with Li, Na, or Mg being particularly preferable. In the above formula (2), d=0 to 5, e=1 to 2, and f=1 to 3.

In the above formula (2), $N^2$ is at least one metal selected from the group consisting of transition metals, Al, and Cu, with Co, Cu, or V being particularly preferable. As more specific examples of a preferable anode material, $LiCoPO_4$, $LiCuPO_4$, $Li_3V_2(PO_4)_3$, and the like can be mentioned.

The solid electrolyte layer 3 is an area containing a solid electrolyte. The solid electrolyte layer 3 has a form of a layer (a thin film) and is usually disposed to separate the cathode 1 and anode 2. The thickness of the solid electrolyte layer 3 is preferably 5 to 500 micrometers, and still more preferably 20 to 100 micrometers.

The solid electrolyte contained in the solid electrolyte layer 3 of the all-solid-state battery of this embodiment is a phosphoric acid compound, as are the cathode material and anode material. Specifically, the solid electrolyte used for the all-solid-state battery of the present invention may be a phosphoric acid compound which contains $PO_4$ as a polyanion. As specific examples of the solid electrolyte, phosphoric acid compounds shown by the following formula (3) can be given.

(3)

In the formula (3), M represents H, Li, Na, Mg, Al, K, or Ca, with Li, Na, or Mg being particularly preferable and g=0 to 5, h=1 to 2, and i=1 to 3.

In the above formula (3), $N^3$ is at least one element selected from the group consisting of Ti, Ge, Hf, Zr, Al, Cr, Ga, Fe, Sc, and In, with Ti, Ge, or Al being particularly preferable. As more specific examples of a preferable solid electrolyte, cation conductors having a NASICON structure such as $LiTi(PO_4)_3$, $Li_{1.3}Al_{0.3}Ti_{1.7}(PO_4)_3$, $Li_{1.5}Al_{0.5}Ge_{1.5}(PO_4)_3$, and the like can be given.

In the all-solid-state battery of the present invention, all of the cathode material, anode material, and solid electrolyte are phosphoric acid compounds. A battery having a higher output and a longer life can be obtained by using $PO_4$ as a polyanion for all of the cathode material, anode material, and solid electrolyte in this manner. It is thought that the use of the same polyanion for all of the cathode material, anode material, and solid electrolyte increases mutual ionic conductivity among the cathode, anode, and solid electrolyte layer, whereby a large current delivery capacity and the charge-and-discharge cycle characteristics can be improved. In addition, in order to ensure a higher output, superior charge-and-discharge cycle characteristics, and a longer life, the cathode material, anode material, and solid electrolyte respectively have a vertex joint-ownership skeleton structure in which each has a common vertex of $PO_4$.

M in the formulas (1) to (3) may be either the same element or different elements in each of the compounds represented by the formulas (1) to (3), provided that M in the formulas (1) to (3) is preferably the same element, particularly preferably Li (i.e., a lithium cation) in all of the cathode material, anode material, and solid electrolyte. A battery having a higher output and a longer life can be obtained by using a specific element (M) for all of the cathode material, anode material, and solid electrolyte in this manner. It is thought that if M in the formulas (1) to (3) is the same for all of the cathode material, anode material, and solid electrolyte, mutual ionic conductivity throughout the cathode, anode, and solid electrolyte layer increases, whereby a large current delivery capacity and the charge-and-discharge cycle characteristics can be improved. Furthermore, it is preferable that all of the cathode material, anode material, and solid electrolyte are cationic conductors having a NASICON structure.

All components of the all-solid-state battery of the present invention are solids, and preferably ceramic materials. Therefore, the battery possesses high safety and is free from problems such as deterioration of battery performance due to leakage of liquid and corrosion. Furthermore, since all the components are made of solids, preferably ceramic materials, the all-solid-state battery can be manufactured at a low cost using a simple process.

An appropriate amount of water is included in the internal electrode body of the all-solid-state battery of the present invention. The all-solid-state battery of the present invention in a state in which the internal electrode body contains water has a large charge-and-discharge capacity and exhibits a high output as compared with conventional all-solid-state batteries not containing water due to exclusion of water in the course of production. There are no limitations to the area of the internal electrode body in which water is included. The water may be present in the cathode, anode, or solid electrolyte layer, or may be present in two or more different areas. The method for causing water to be included in the internal electrode body will be described later.

The amount of water to be included (water content) in the internal electrode body is 0.3 to 10 mass %, preferably 0.5 to 6 mass %, and still more preferably 1 to 4 mass %, for 100 mass % of the internal electrode body (cathode material, anode material, and solid electrolyte). The water content of the internal electrode body in this range ensures a battery with a large charge-and-discharge capacity and a high output. If the water content of the internal electrode body is less than 0.3 mass %, the effect of water inclusion may not be exhibited. A water content exceeding 10 mass % may rather decrease the charge-and-discharge capacity and output of the battery.

Figure 2:
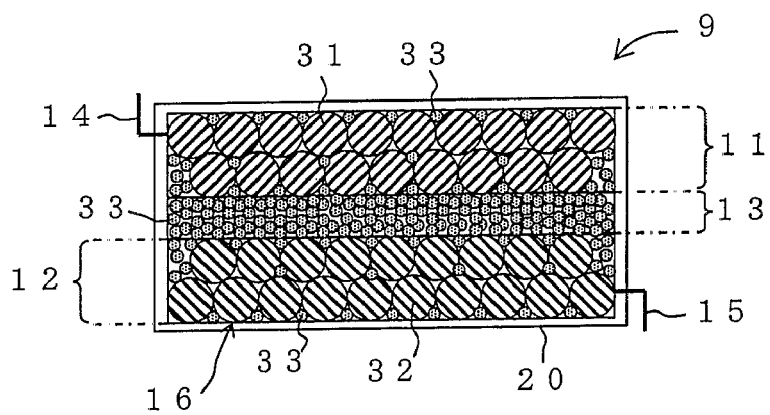
FIG. 2 is a partial schematic diagram showing another embodiment of an all-solid-state battery according to the present invention.

FIG. 2 is a partial schematic diagram showing another embodiment of the all-solid-state battery according to the present invention. In FIG. 2, a cathode 11 is an aggregate of a number of particles of a cathode material 31. A cathode collector 14 is electrically connected to the cathode 11. An anode 12 is an aggregate of a number of particles of a cathode material 32. An anode collector 15 is electrically connected to the anode 12. In addition, a solid electrolyte layer 13 is an aggregate of a number of particles of a solid electrolyte 33. In FIG. 2, the reference numeral 16 indicates an internal electrode body and 20 indicates a battery case in which the internal electrode body 16 is housed.

In the all-solid-state battery 9 of this embodiment, the solid electrolyte 33 is included in the cathode 11 and anode 12. When this requirement of inclusion of a solid electrolyte 33 in the cathode 11 and anode 12 is satisfied, a battery with a higher output and a longer life can be obtained. This is thought to be the results of improved ion conductivity among the cathode 11, anode 12, and solid electrolyte layer 13. More specifically, it is desirable that a great number of particles of the solid electrolyte 33 be included in each electrode in a three-dimensionally connected state in boundaries of particles of the active materials forming each electrode (cathode material 31 and anode material 32).

Although the solid electrolyte 33 may be included in either the cathode 11 or anode 12, inclusion of the solid electrolyte 33 in both the cathode 11 and anode 12 is preferable in order to obtain a battery with a higher output and a longer life.

Figure 3:
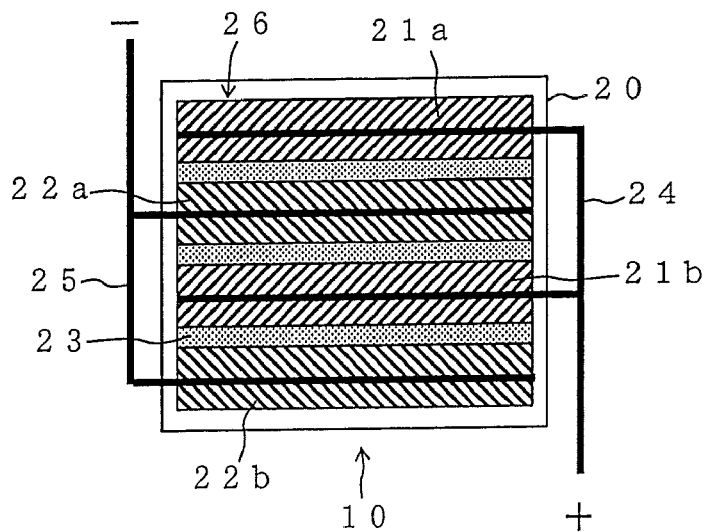
FIG. 3 is a partial schematic diagram showing still another embodiment of an all-solid-state battery according to the present invention.

FIG. 3 is a partial schematic diagram showing still another embodiment of the all-solid-state battery according to the present invention. The all-solid-state battery 10 of the embodiment shown in FIG. 3 comprises two or more cathodes 21a and 21b and two or more anodes 22a and 22b, which are laminated to form a laminate with a layer of solid electrolyte layer 23 intervening between the layers. A cathode collector 24 is electrically connected to the cathodes 21a and 21b. An anode collector 25 is electrically connected to the anodes 22a and 22b. In this manner, the all-solid-state battery may have a laminated structure comprising two or more cathodes 21a and 21b and two or more anodes 22a and 22b. In FIG. 3, the reference numeral 26 indicates an internal electrode body and 20 indicates a battery case in which the internal electrode body 26 is housed.

Next, a method for manufacturing the all-solid-state battery of the present invention will be described by way of examples. The solid electrolyte, cathode material, and anode material can be prepared by a solid synthesis method, in which raw material powders are mixed to obtain desired compositions, which are fired under prescribed conditions.

A solid electrolyte layer 3 (refer to FIG. 1) can be prepared by molding the resulting powder composition using a press method in which the powder composition is filled into a mold or the like and pressed to form a stratified formed article, which is fired under prescribed conditions.

To a powder of the cathode material that has been prepared, a binder such as polyvinyl alcohol is added to obtain a composition. An appropriate amount of a solid electrolyte may be optionally added to the composition. Next, an organic solvent such as toluene is added to the resulting composition to prepare a cathode slurry (a paste). A conductor such as acetylene black, nickel powder, and gold powder may be added to the cathode slurry. An anode slurry can be prepared in the same manner as the cathode slurry. The resulting cathode slurry and anode slurry are respectively layered on both sides of the solid electrolyte layer 3 by screen printing, for example, and the resulting layered material is fired to obtain an internal electrode body 6 in which a cathode 1, an anode 2, and a solid electrolyte layer 3 are integrated (refer to FIG. 1).

An internal electrode body 6 in which a cathode 1, an anode 2, and a solid electrolyte layer 3 are integrated, shown in FIG. 1, can also be obtained by superimposing a powder containing a cathode material and a powder containing an anode material on both sides of the solid electrolyte layer 3, pressing them from both sides to obtain a laminate, and firing the laminate under prescribed conditions.

As shown in FIG. 1, a cathode collector 4 and an anode collector 5 are disposed respectively on the cathode 1 and anode 2 of the internal electrode body 6. As the material for forming the cathode collector 4 and anode collector 5, platinum (Pt), platinum (Pt)/palladium (Pd), gold (Au), silver (Ag), aluminum (Al), copper (Cu), SS, ITO (indium-tin oxide film), and the like can be given. The cathode collector 4 and anode collector 5 can be disposed on the cathode 1 and anode 2 by a sputtering method, a resistance-heating vapor deposition method in which the material to be vapor-deposited is heated by resistance, an ion beam deposition method in which the material to be vapor-deposited is heated by ion beams, an electron beam evaporation method in which the material to be vapor-deposited is heated by electron beams, a method of placing a metal foil or metal plate, and the like.

A common all-solid-state battery is generally assembled by drying an internal electrode body under appropriate conditions and placing the dried internal electrode body in a battery casing. However, the all-solid-state battery of the present invention contains water as a constituent in the internal electrode body. For this reason, the internal electrode body produced by the above procedure may be housed in a battery casing without drying while ensuring insulation between the cathode collector and anode collector to obtain the all-solid-state battery of the present invention in the state in which an appropriate amount of water is contained in the internal electrode body. In order to obtain an all-solid-state battery in the state in which an appropriate amount of water is contained in the internal electrode body, it is preferable to house the internal electrode body in a battery casing by, for example, any one of the following methods (1) to (4). Each method will be described.

Method (1): The internal electrode body is housed in the battery casing after having been allowed to stand in a wet atmosphere. The wet atmosphere in which the internal electrode body is allowed to stand is preferably at 20 to 50° C. and 90 to 100% RH, and more preferably 25 to 40° C. and 95 to 98% RH. The internal electrode body is allowed to stand in a wetting atmosphere preferably for 1 to 24 hours, and more preferably for 3 to 16 hours.

Method (2): The internal electrode body is housed in the battery casing in an ambient atmosphere. The atmosphere in which the internal electrode body is housed in the battery casing is preferably at 20 to 50° C. and 50 to 100% RH, and more preferably 25 to 40° C. and 70 to 98% RH.

Method (3): The internal electrode body is housed in the battery casing after adding water to the internal electrode body. The amount of water to be added to the internal electrode body is preferably 0.3 to 5 mass %, more preferably 0.5 to 3 mass %, and still more preferably 1 to 2 mass % for 100 mass % of the internal electrode body.

Method (4): The internal electrode body is housed in the battery casing after adding water to the battery casing. The amount of water to be added to the battery casing is preferably 0.3 to 5 mass %, more preferably 0.5 to 3 mass %, and still more preferably 1 to 2 mass % for 100 mass % of the internal electrode body.

In order to obtain an all-solid-state battery of the present invention, it is preferable to house the internal electrode body in the battery casing by at least one of these methods (1) to (4), A combination of two or more of these methods is also preferable. From the viewpoint of accurately controlling the amount of water to be included in the internal electrode body, it is more preferable to house the internal electrode body in battery casing by the above methods (3) and/or (4).

EXAMPLES

The present invention is described below in detail based on examples. However, the present invention is not limited to the following examples.

Example 1

Figure 4:
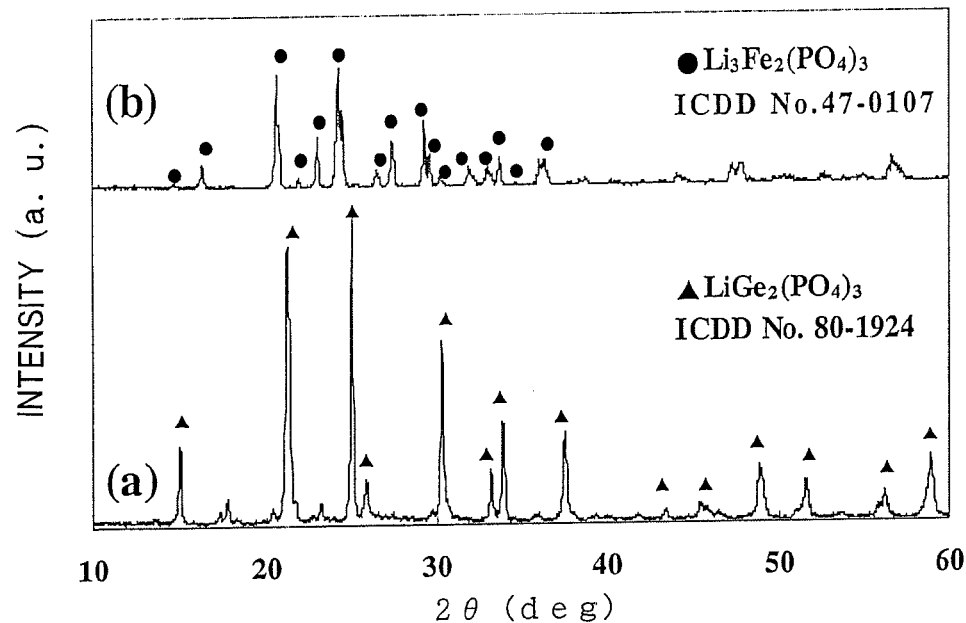
FIG. 4 is a chart showing the results of X-ray diffraction measurement (XRD) of an LAGP powder and an LVP powder.

$Li_{1.5}Al_{0.5}Ge_{1.5}(PO_4)_3$ (LAGP) was produced by a solid synthesis method by mixing powders of $Li_2CO_3$, $GeO_2$, $Al_2O_3$, and $NH_4H_2(PO_4)_3$ in amounts corresponding to the stoichiometric composition of LAGP. The mixture was fired at 900° C. in an ambient atmosphere to obtain a powder of LAGP. A powder for a cathode (anode) material, $Li_3V_2(PO_4)_3$ (LVP), was produced by a solid synthesis method by mixing powders of $Li_2CO_3$, $V_2O_3$, and $NH_4H_2(PO_4)_3$ in amounts corresponding to the stoichiometry composition of LVP. The mixture was fired at 930° C. in an argon stream to obtain a powder of LVP. FIG. 4 is a chart showing the results of X-ray diffraction measurement (XRD) of the resulting LAGP powder and LVP powder. In FIG. 4, the lower chart (a) shows the results of the measurement of the LAGP powder and the upper chart (b) shows the results of the measurement of the LVP powder. As shown in FIG. 4, peaks attributable to LAGP and LVP (provided that the peak of LVP is attributed by $Li_3Fe_2(PO_4)_3$ with the same NASICON structure) were observed in both charts. However, no unusual configuration was observed.

Figure 5:
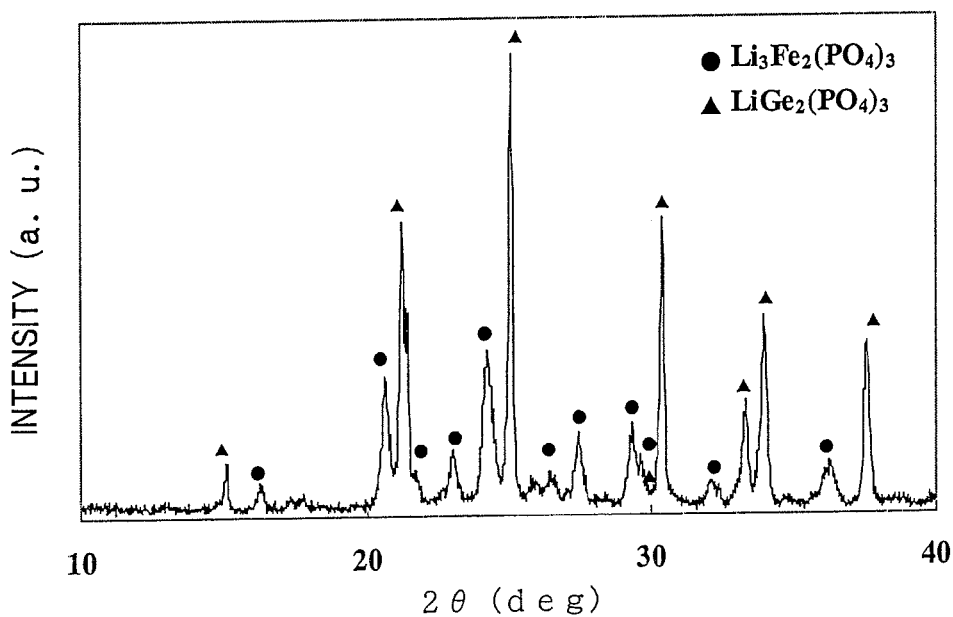
FIG. 5 is a chart showing the results of X-ray diffraction measurement (XRD) of an electrode layer (LVP electrode layer).

The LAGP powder was molded using a metal die press and fired at 900° C. in an ambient atmosphere to obtain an LAGP fired body with a diameter of about 14 mm and a thickness of about 1 mm. The density of the resulting LAGP fired body was about 3 g/cm³, equivalent to about 87% of the theoretical density. An electrode paste was prepared by mixing the LVP powder with acetylene black to an acetylene black concentration of 25 mass %. The electrode paste was applied to the both sides of the LAGP fired body by screen printing to form a sheet with a diameter of 12 mm and fired at 700° C. in an argon stream to obtain a fired laminate (an internal electrode body) in which electrode layers (a cathode layer and anode layer) and a solid electrolyte layer are integrated. The mass of the resulting internal electrode body was about 0.45 g and the volume was about 0.13 cc (0.13 ml). The thicknesses of the resulting electrode layers (cathode layer and anode layer) were respectively about 20 micrometers. FIG. 5 is a chart showing the results of X-ray diffraction measurement (XRD) of the formed electrode layer (LVP layer). As shown in FIG. 5, peaks attributable to LAGP and LVP (provided that the peak of LVP is attributed by $Li_3Fe_2(PO_4)_3$ with the same NASICON structure) were observed, with no unusual configuration being observed.

The internal electrode body was allowed to stand in a wet atmosphere at 25° C., 98% RH overnight (15 hours) and incorporated into a CR2032-type coin battery in an ambient atmosphere to obtain an all-solid-state battery (Example 1). The water content of the internal electrode body immediately before incorporating into the CR2032-type coin battery was about 2 mass %.

Example 2

An all-solid-state battery of Example 2 was prepared in the same manner as in Example 1, except that 5 microliters of ultrapure water was added dropwise to the two electrode layers (LVP electrode layers) of the internal electrode body in which collector layers were formed and the internal electrode body was incorporated into a CR2032-type coin battery in an ambient atmosphere. The water content of the internal electrode body immediately before incorporating into the CR2032-type coin battery was about 1.3 mass % for 100 mass % of the internal electrode body.

Comparative Example 1

An all-solid-state battery of Comparative Example 1 was prepared in the same manner as in Example 1, except that the internal electrode body on which the collector layer was formed was dried under vacuum at 130° C. for two hours and incorporated into a CR2032-type coin battery in a glove box in an Ar atmosphere. The water content of the internal electrode body immediately before incorporating into the CR2032-type coin battery was about 0.01 mass %.

[Charge-and-Discharge Cycle Test]

Figure 6:
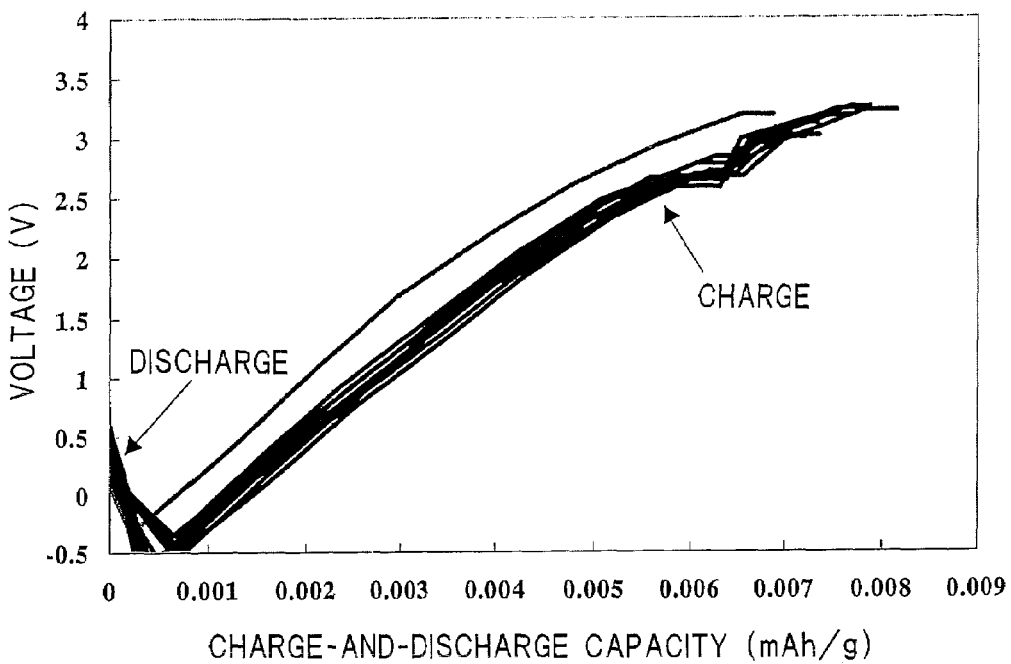
FIG. 6 is a graph showing a charge-and-discharge cycle curve of the all-solid-state battery of Comparative Example 1.
Figure 7:
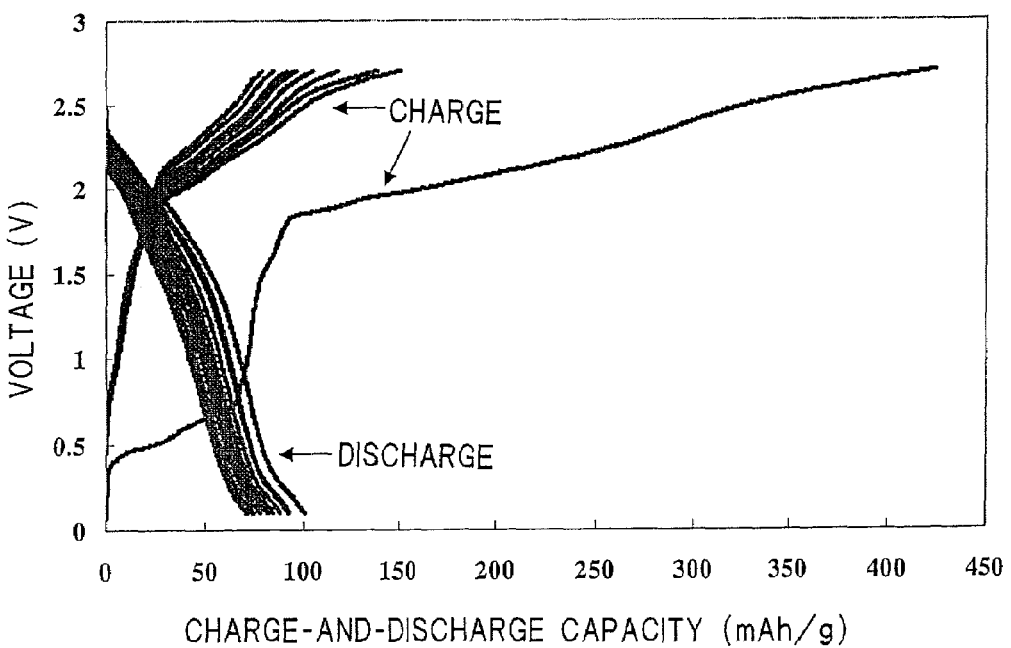
FIG. 7 is a graph showing a charge-and-discharge cycle curve of the all-solid-state battery of Example 1.
Figure 8:
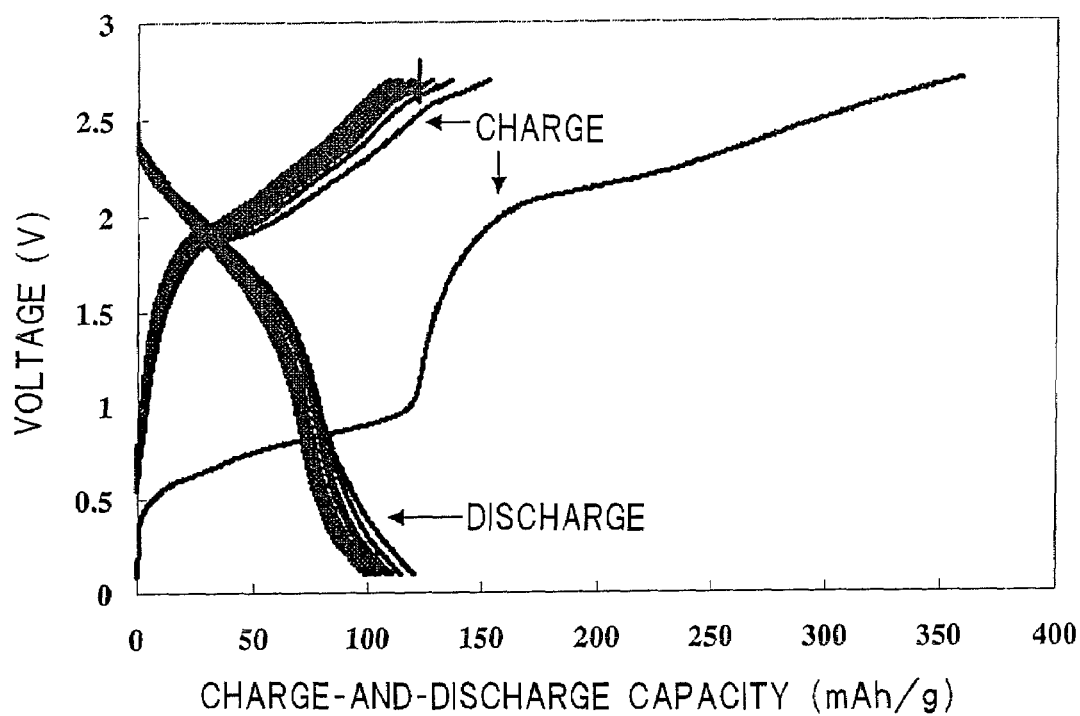
FIG. 8 is a graph showing a charge-and-discharge cycle curve of the all-solid-state battery of Example 2.

The initial discharge capacitance (mAh/g) of each all-solid-state battery was measured. The measurement results are shown in Table 1. "g" in the unit "mAh/g" of the initial discharge capacitance indicates the mass of the cathode. A ten-cycle charge and discharge test was carried out for each all-solid-state battery at room temperature (25° C.) at a charge-and-discharge current (microA/cm²) and a charge-discharge potential (voltage) shown in Table 1. Charge-and-discharge cycle curves of all-solid-state batteries of Comparative Example 1, Example 1, and Example 2 are shown in FIGS. 6 to 8.

TABLE 1

| | Measuring temperature (° C.) | Charge-discharge current (A/cm²) | Charge-discharge potential (V) | Initial discharge capacitance (mAh/g) |
|---|---|---|---|---|
| Comparative Example 1 | 25 | 0.9 | 0.1 to 3.0 | 0.0004 |
| Example 1 | 25 | 90 | 0.1 to 2.7 | 101 |
| Example 2 | 25 | 90 | 0.1 to 2.7 | 121 |

(Discussion)

It can be seen from the results shown in FIGS. 6 to 8 that the all-solid-state batteries of Example 1 and Example 2 exhibited a large initial discharge capacitance and a high output as compared with the all-solid-state battery of Comparative Example 1.

The all-solid-state battery of the present invention is suitable as a battery for portable instruments, a built-in battery for chip-cards, a battery for in-plant medical devices, a battery for a substrate-surface package, a battery used in combination with other batteries such as a solar battery (cells for hybrid power supplies), and the like.

What is claimed is:

1. An all-solid-state battery comprising:
    an internal electrode body having a cathode comprising a cathode material, an anode comprising an anode material, and a solid electrolyte layer containing a solid electrolyte;
    wherein the cathode material, the anode material, and the solid electrolyte comprise phosphoric acid compounds including $PO_4$ as a polyion thereof;
    wherein the internal electrode body is integrated by firing the cathode, the anode, and the solid electrolyte layer; and
    wherein the internal electrode contains water in an amount of 0.3 to 10 mass %.

2. The all-solid-state battery according to claim 1, further comprising a battery case, in which the internal electrode body is housed after being allowed to stand in a wet atmosphere and/or in which the internal electrode body is housed in a wet atmosphere.

3. The all-solid-state battery according to claim 1, further comprising a battery case, wherein the internal electrode body is housed in the battery case after water is added to the internal electrode body and/or the battery case.

4. The all-solid-state battery according to claim 3, wherein the amount of water added to the internal electrode body and/or the battery case is 0.3 to 5 mass % for 100 mass % of the internal electrode body.

5. The all-solid battery according to claim 1, wherein the cathode material, the anode material, and the solid electrolyte are cationic conductors having a NASICON structure.

6. The all-solid battery according to claim 1, wherein the cations of the cathode material, the anode material, and the solid electrolyte are lithium cations.

7. The all-solid battery according to claim 1, wherein the solid electrolyte is included in at least one of the positive electrode and the negative electrode.

* * * * *